Oct. 11, 1927.

E. SPRAGUE, JR 1,645,260

METHOD AND APPARATUS FOR MAKING CONFECTIONS

Filed Feb. 29, 1924    4 Sheets-Sheet 1

Witnesses:
W. P. Kilroy
Harry R. L. White

Inventor:
Edward Sprague Jr
By Nice & Nice Attys.

Oct. 11, 1927.
E. SPRAGUE, JR
1,645,260
METHOD AND APPARATUS FOR MAKING CONFECTIONS
Filed Feb. 29, 1924    4 Sheets-Sheet 2
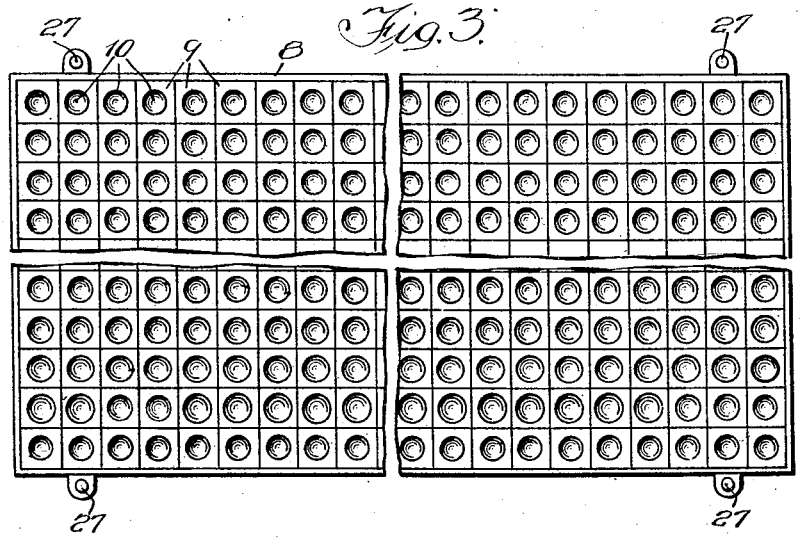
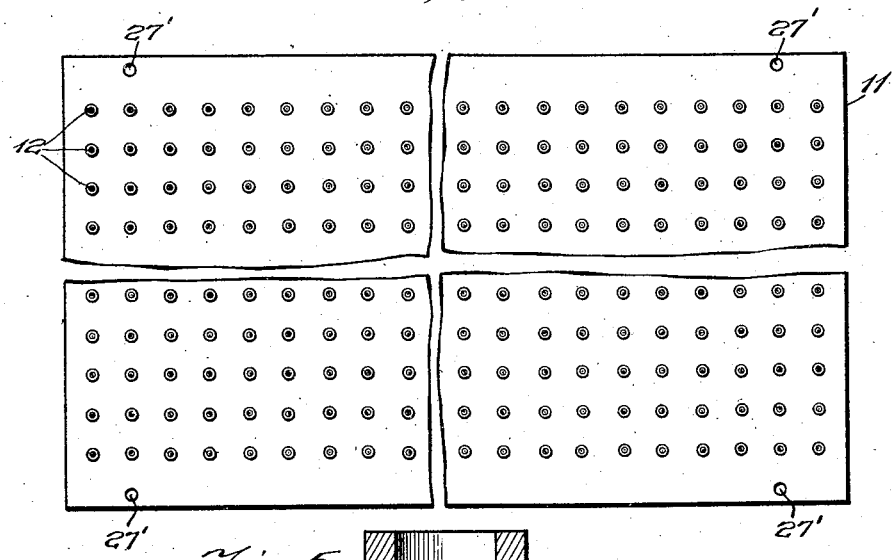
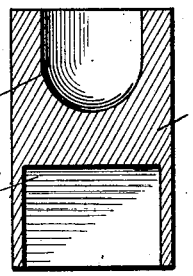
Witnesses:
W. F. Kilroy
Harry R. L. White
Inventor:
Edward Sprague Jr.
By ………… Attys Oct. 11, 1927. 1,645,260
E. SPRAGUE, JR
METHOD AND APPARATUS FOR MAKING CONFECTIONS
Filed Feb. 29, 1924    4 Sheets-Sheet 3
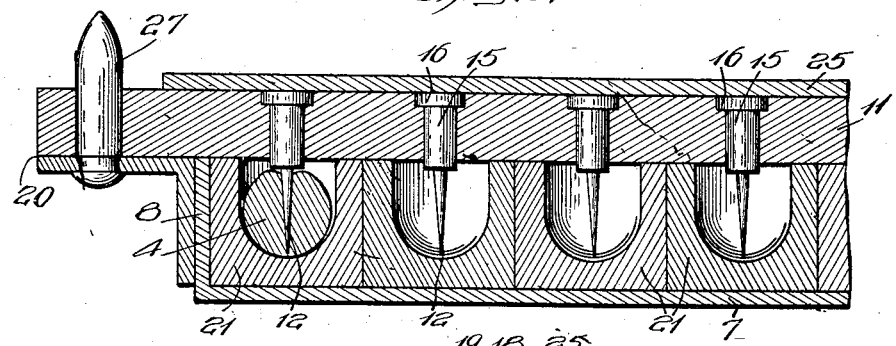
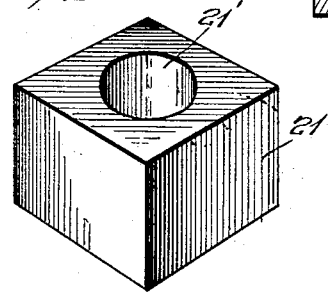
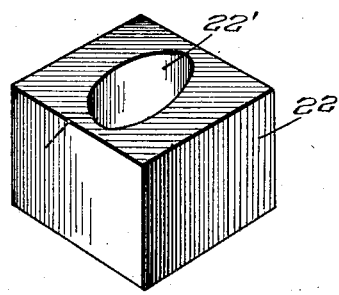
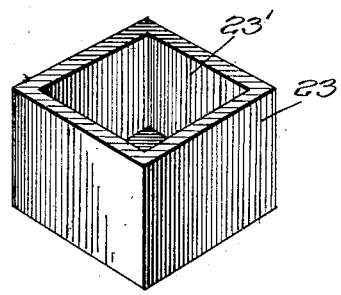
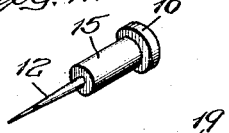
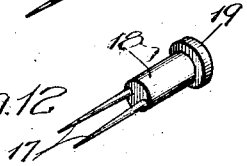
Witnesses:
W. F. Kilroy
Harry R. Lichin
Inventor:
Edward Sprague Jr.
By
Attys

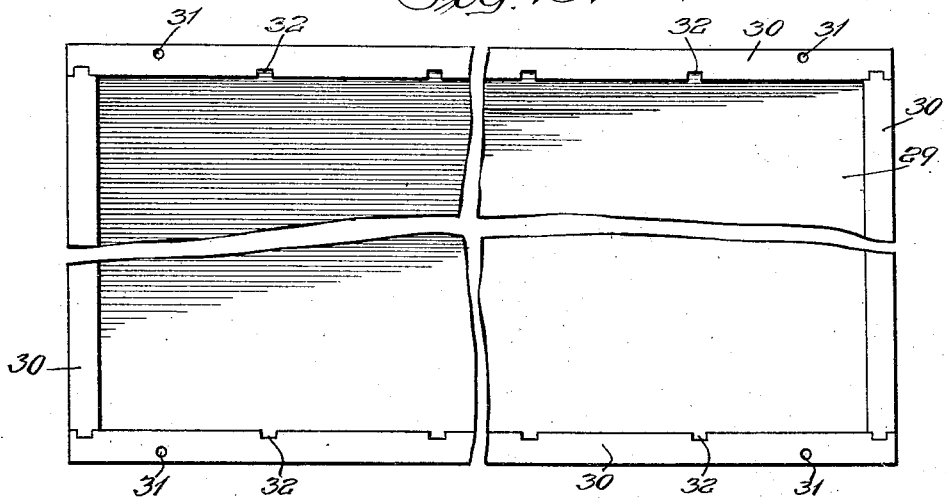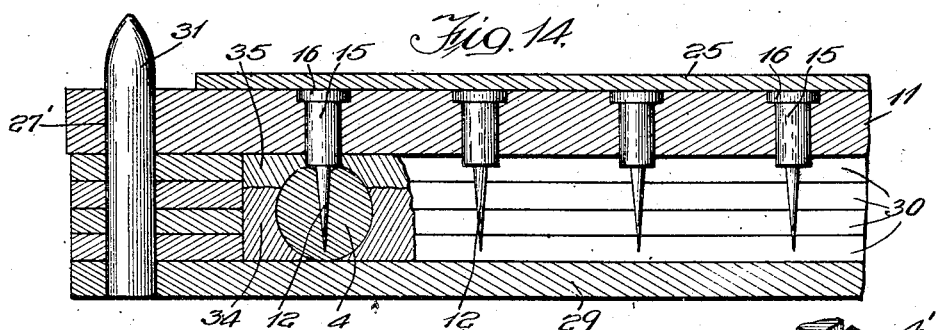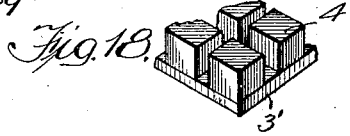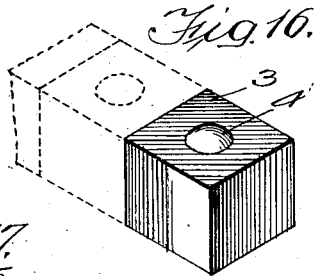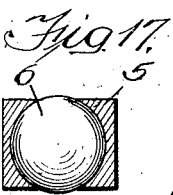

Patented Oct. 11, 1927.

1,645,260

UNITED STATES PATENT OFFICE.

EDWARD SPRAGUE, JR., OF CHICAGO, ILLINOIS, ASSIGNOR OF FORTY-NINE ONE-HUNDREDTHS TO BLANCHE K. DUSTIN, OF CHICAGO, ILLINOIS.

METHOD AND APPARATUS FOR MAKING CONFECTIONS.

Application filed February 29, 1924. Serial No. 696,018.

My invention relates to the art of making confectionery, and relates more particularly to an improved method or process and apparatus for confections with a suitable insert or center. More especially it relates to a novel method of manufacture in which desired centers or inserts are applied and confined within or on a suitable base, and to the apparatus particularly adapted to facilitate carrying out the method.

The invention has among its objects the manufacture of confections or the like by a simple, convenient, efficient and satisfactory method which will produce an attractive, pleasing, desirable and satisfactory product. It has among its further objects the production of a simple, inexpensive, efficient and satisfactory apparatus of the kind described for use wherever found applicable.

Many other objects and advantages and the possibilities of the method and apparatus herein described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts:

Fig. 3 is a top elevation of one type of recessed slab;

Fig. 4 is a view in elevation of the plate showing the carriers;

Fig. 5 is a sectional view illustrating one type of recessed unit;

Fig. 6 is a sectional view illustrating a portion of the recessed slab and plate;

Fig. 7 is another type of recessed unit;

Fig. 8 is a similar view of another type;

Fig. 9 is a similar view of another type of recessed unit;

Fig. 10 is a sectional view illustrating a portion of the carrier plate and one of the carriers with an insert body carried thereby;

Fig. 11 is a perspective view of one type of carrier or prong;

Fig. 12 is a similar view of another type;

Fig. 13 is a plan view of the receiving slab;

Fig. 14 is a sectional view through a portion of the same illustrating a step in the process;

Fig. 15 is a perspective view of a completed product of one type with insert sealed in;

Fig. 16 is a similar view of a portion of another product with insert exposed;

Fig. 17 is a sectional view through a piece of confection, illustrating a slight modification; and Fig. 18 is a perspective view of a product, illustrating another modification.

Before describing in detail the method and apparatus suitable for carrying out the method, it may be mentioned that the purpose of the same is to secure a confection or the like consisting of what may be termed a suitable base or container, within or on which is arranged a suitable filler element or center, which, for convenience, may be termed an insert. The base may be caramel, chocolate, or any like material or combination of materials which may be brought to a viscous or molten state and which, upon cooling, will harden or set. In some instances it may be a pastry base or the like. The degree of hardness or set will of course depend upon the nature of the base. The inserts or centers may be as desired, as for example, Maraschino cherries, nuts, marshmallows, gum drops, caramels or various kinds of fruits, cherries, candies, or any other edible substance which it is desired to use and which are suitable for the purpose. The insert, center or the like may be completely immersed or set in and enclosed in the base or only partially set in or anchored, as will be more fully described hereinafter.

Referring particularly to Figs. 15 to 18 inclusive, I have shown for purposes of illustration several simple types of the product, it being understood that these are merely for purposes of making clear the method and apparatus.

In Fig. 15, there is shown a cake or bar made up with the centers entirely enclosed. The bar may be cut into pieces or parts of the desired size and shape, as for example, into caramels, or squares 1 by cutting on the lines 2 after the product has been made up. In this particular case, each one of the individual squares contains a center or filler of the desired material.

In Fig. 16, the base 3 is shown provided with a center or filler 4. In this case, the same is made so that the filler is partially displayed rather than entirely concealed, as shown in Fig. 15. This figure also further illustrates how the cake shown in Fig. 15 may be cut up.

In Fig. 17, 5 represents the base of suitable material and 6 the center or insert, also of suitable material. This figure illustrates how the article may be made up with the filling partially displayed at both sides. In Fig. 18 is illustrated another type in which 3' represents the base and 4' spaced inserts which are practically entirely exposed, except to the extent in which they are anchored in the base. Any of the bars or separate confections may be coated, iced and wrapped, or otherwise treated in addition to the steps which are shown herein. My invention relates particularly to the novel method and apparatus for assembling the various centers or inserts and their transfer and anchoring or insertion on or in the base in a predetermined relation thereto.

Figure 1:
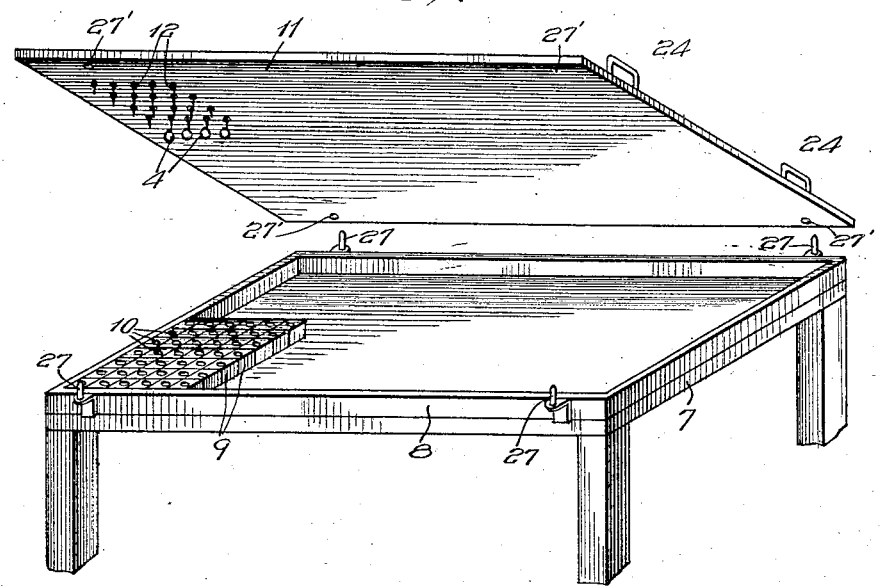
Fig. 1 is a perspective view of the recessed slab with the carrier plate shown raised thereabove.

Referring to Fig. 1 and Fig. 3, 7 represents a table top, slab or the like of suitable size, shape and material. This may be made to correspond in size with the customary slab used by confectioners, which is about 6 ft. by 3 ft., or such other size as is desired. The slab 7 is provided with a plurality of recesses or pockets, or with supplemental parts having the recesses which are mounted on the top of the slab. In the drawings, I have illustrated supplemental or interchangeable units adapted to be placed on the top of the slab, thereby providing a plurality of recesses or pockets, and the same constituting substantially a magazine. Several types of interchangeable units are shown in Figs. 5, 7, 8 and 9, these being illustrative of possible designs. In the type shown in Fig. 5, 9 represents a unit which, in this case, is provided with a plurality of recesses 10 and 10', so that the units may be reversed, the same being therefore adapted for two different styles of fillers or inserts. This particular one illustrated, for example, would be adapted for the assembling of cherries or like fruit in the recess 10, or for marshmallows, caramels, or the like, in the recess 11 when the same is reversed. These magazine units are arranged on the slab or table top 7, as indicated in Fig. 1 or Fig. 3, a flange or retainer 8 being preferably provided for maintaining the same in assembled relation. It may be mentioned that the various magazine units may be assembled on the table or slab so that various combinations of fillers or inserts may be assembled.

Arranged to cooperate with the magazines is a top or carrier plate 11 which carries a plurality of prongs or carriers 12 of the desired size and shape, there preferably being one for each recess or recessed unit and the same being so disposed that each one is substantially centrally the recess when the plate is positioned, for example, as illustrated in Fig. 6. These prongs may be secured in the carrier plate in any satisfactory manner, but, as shown, I provide the same with a shank 15 and a flanged end 16, a plate 25 serving to lock all of the prongs in place. In most instances, a single prong 12 is sufficient, but in other cases it is sometimes desirable in order to prevent displacement of the insert during the transfer to or immersion in the base, as will be hereinafter described, to provide a plurality of prongs as shown in Fig. 12. Referring to this figure, 17 represents two prongs arranged on a shank 18 and provided with a flange 19 similar to the flange 16. Any equivalent for the two prongs may be employed which will prevent turning or shifting of the article carried thereby.

The magazine unit 21 shown in Fig. 7 is similar to that shown in Fig. 5, except that it is not reversible, the recess 21' being of such shape as may be desired, in this instance, being similar to the recess 10. In Fig. 6, I have shown this type of unit arranged on the table or slab. In Fig. 8, the unit 22 is provided with an elongated recess 22', this illustrating a unit adapted for use for a nut, or the like, such as an almond or like shape. The unit 23 shown in Fig. 9 is provided with a recess 23' intended for use for example, for caramels, marshmallows, or the like, for various other articles. It is obvious that the units may be provided with recesses of the desired size and shape. As I mentioned before, while I prefer to use a plurality of magazine units to make up the magazine, when the units are assembled on the slab the same form substantially a unitary structure, and consequently a unitary structure with a plurality of recesses therein will function in the same manner as a plurality of recessed units.

In Fig. 10, there is illustrated one of the carriers provided with two prongs carrying a rectangular insert 28 as distinguished from the spherical insert 4 shown in Fig. 6. Using the magazine or assembling device, it may be assumed that the units are all assembled, for example, as shown in Fig. 3, and that it is desired to fill the magazine with Maraschino cherries, raspberries, strawberries, or any other center or insert. In this case, the operator may throw or pour the bulk cherries or the like on the top of the magazine and then merely carefully wipe over the top, whereupon one of the cherries will fill each recess. When the desired number or all of the recesses have been filled, the operator places the carrier plate 11 over the same and lowers it into place, thereby causing the prongs or carriers to enter into the recesses and pierce the cherries or the like, thereby securing them together in assembled relation.

It will be noted by referring to Figs. 1, 3 and 6 that I provide pins 27 on the table adapted to engage in the openings 27', thereby centering the plate carrier so that the prongs are centered in the recesses. It may be mentioned that if it is desired to vary the distance, the prongs will extend into the recesses, this may be done by placing washers, shims, or the like between the plate 11 and the brackets carrying the pins 27 at 20. (See Fig. 6.) Obviously, a washer of the desired size or thickness mounted on each of the pins 27 will serve the purpose. The plate carrier 11 is preferably provided with the desired number of handles 24 so that the same may be picked up conveniently and carried to the slab upon which the operations are completed. Lifting the carrier plate obviously lifts all of the cherries or inserts which are maintained in assembled spaced relation.

Figure 2:
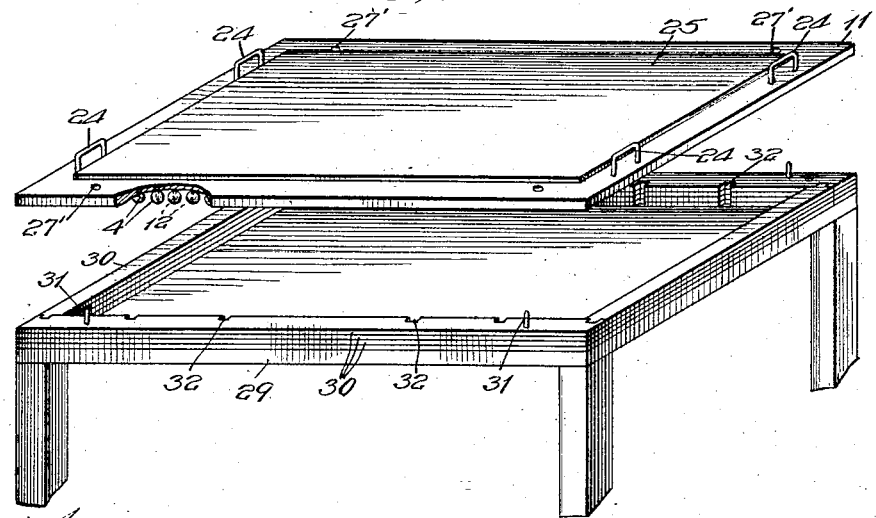
Fig. 2 is a similar view of the receiving slab and also illustrating the carrier plate.

In Figs. 2, 13 and 14, I have illustrated the slab which is of the desired size and shape and which is adapted to receive the base which is poured thereon in a viscous molten or liquid state. As shown, 29 represents the slab, and this may be and is preferably similar to the slabs now used by confectioners. I provide the same, however, with a flange about the edge. The flange shown is preferably made in a plurality of sections 30 so that it may be made the desired depth. These sections 30 may be secured to the slab and maintained in assembled relation by the pins 31, which I prefer to so dispose on the slab that they will mate with the holes 27 in the carrier plate 11. In Fig. 14, I have illustrated the carrier plate 11 in position on the slab. In case it is not desired to use the whole slab for a batch of confectionery, the flanges may be made with the recesses 32 in which cross partitions may be arranged. These may also be arranged to separate different kinds of batches of viscous bases poured on the slab.

Referring particularly to Fig. 14, 34 represents a viscous base of the desired depth. In carrying out the method, before the carrier plate 11 is positioned as shown in this figure, a batch of the base material 34, which is in a viscous, molten, liquid or semi-liquid state, is poured on the slab and to the desired depth, depending upon the product desired. After this has been arranged, the plate 11 carrying the inserts 4 is positioned, the inserts being thus immersed in their assembled relation in the base and uniformly spaced apart. After the base has partly set or hardened, the plate is lifted, but the molten base having partly set, will retain the inserts so that they are removed from the prongs and remain in or on the base on the slab. After the removal of the plate 11, if desired, a top layer of the base material, or such other material as desired, may be poured over the top as indicated at 35, the same being preferably spread over so as to give a smooth finish on the top and seal the openings left by the removal of the prongs. The product then on the slab would be substantially as indicated in Fig. 15, covering the entire slab or so much thereof as was covered. The set base may then be cut by suitable cutters, not shown, but generally used in the art, and the batch cut into cakes, bars or pieces of the desired size and shape. It may be cut into small cakes, as indicated in Fig. 15, or smaller bars as indicated in Fig. 16, or in small units as indicated in Fig. 17. The amount of material both below and above the insert may be regulated by variations in the depth of the batch of base or by removing or adding flange sections 30 or by using modified types of carriers 11. In Fig. 16, I have illustrated how on one face the insert 4 is exposed while in Fig. 17 the insert 6 is exposed at both faces.

In Fig. 18, I have illustrated how the inserts 4' are substantially merely anchored on a base 3'. They are maintained in spaced relation so that any one or more can be broken off of a larger piece.

The advantages and simplicity of the method and the convenience of the apparatus will be obvious to those skilled in the art. It may be mentioned that while the inserts are in the magazine units, the same may be coated with any suitable icing or other coating which is transferred with the insert to the base, making possible a novel and pleasing confection in many cases.

It will be noted that the individual handling of each insert and individual transferring of the same to the base is entirely done away with, it being possible for one or two operators in less time to do many times the work of several working by hand; and in addition, the hand manufacture is not practical for commercial manufacture because it is impossible to evenly and accurately space the inserts and to make up a large batch where the base is of a nature that sets in a short time.

The invention is particularly adapted to the manufacture of caramels, either with or without the inserts. It has heretofore been almost impossible to commercialize the small caramel squares on a large scale, that is to say, the large candy manufacturer has kept away from the caramel industry because of the difficulty and lack of a way to pack and ship the product so that same will reach the retailer and the trade in salable condition. Caramels packed and sent in bulk have a tendency to run together and the jobber is handicapped because it is impossible for the retailer to properly retail the same in small quantities of several or more individual caramels. By running out on a slab a caramel base of, for example, a quarter inch and then emerging caramel squares into this molten base in a uniform way, for example, as illustrated in Fig. 18, with each caramel spaced say one-eighth inch apart and in line, when this molten base sets, the entire combination can be cut in squares, for example, in squares 12" by 12" and packed in tiers in boxes. The dealer, when it reaches his hands, can then break off small quantities, say five or ten cent pieces, or a half of pound pieces, or it may be cut easily by the retailer. In this way, the handling of the caramels may be commercialized.

Where Maraschino cherries are emerged or inserted in a caramel base of any desired flavor and the caramel covered cherry is dipped in chocolate coating to seal the same in, in a few weeks the juice of the cherry is absorbed by the caramel base which is of good thickness, and the cordial or juice is increased in quantity. While the chocolate may be omitted the chocolate coated caramel and cherry will hold up for a considerable length of time, resulting in a more delicious covered cherry, as well as a commercial article. When nuts, as for example almonds, are used for the inserts, it is generally preferred to soften up the same before placing in the magazine so that the prongs will pierce the same and not break or crumble the nut. Marshmallows may be immersed in a similar manner to the caramels. The method and apparatus may be employed in the manufacture of pastry, desserts and other food products, producing a new, novel and attractive article. In carrying out the method and the employment of the apparatus, I wish to be understood that the the base materials or coatings or coverings may be caramel, chocolate or any other material or a combination of materials satisfactory for the purpose applied as desired in a preferred order; and I also wish to be understood that the centers, fillers or inserts may be cherries or other fruit, caramels, marshmallows, nuts, gum drops, candies or such other articles, materials, or combinations of materials as may be found suitable or desirable. I also wish it understood that the confection herein described may be additionally coated and covered, cut, or may be wrapped or packed and handled in any suitable manner. In the claims wherein I refer to immersing the inserts I wish to be understood that the immersing may be partially or entirely, the extent not being always a definite distance.

Having thus described my invention, it is obvious that various immaterial changes may be made in the processes or in the apparatus herein described without departing from the spirit of my invention, hence I do not wish to be understood as limiting myself to the exact method or apparatus herein shown and described nor to any particular kind of product produced as a result thereof.

What I claim as new and desire to secure by Letters Patent is:

1. A method of making confections consisting in assembling a plurality of filler elements in a definite arrangement, thence securing them in fixed spaced relation by suitable securing means to maintain them in their relative positions, thence inserting the assembled elements in a suitable base of viscous material and after an interval removing the securing means and then cutting the base into parts with the edible elements embedded therein.

2. A method of making confections consisting in assembling a plurality of filler elements in a definite arrangement, thence securing them in fixed spaced relation by suitable securing means to maintain them in their relative positions, thence immersing the assembled elements in a suitable base of viscous material and after an interval removing the securing means, and thence cutting the base at points between the spaced filler elements to provide pieces of the desired size and shape.

3. In combination, a slab upon which confection in liquid form may be poured, walls mounted upon the slab for confining the confection to a desired space, one of said walls being adjustable toward and away from another of said walls, a plate adapted to rest upon said walls, and a plurality of spaced prongs projecting from the under surface of the plate.

4. In combination, a slab upon which confection in liquid form may be poured, a plurality of walls mounted upon said slab for confining the confection to a predetermined space, each of said walls comprising a plurality of layers, a plate adapted to rest upon said walls, and a plurality of spaced prongs projecting from the under surface of the plate.

5. In combination, a table, an upstanding flange at the edges thereof, a plurality of individual recessed units mounted upon the table within the confines of the flange, a cover plate, and means carried by the plate for supporting individual elements to be positioned within the recesses of the individual units.

6. In combination, a table top having an upstanding flange at its edges, a plurality of recessed units arranged on the table top within the confines of the flange, a cover plate, a plurality of carrying members projecting from the under side of the cover plate, and means whereby to guide the carrying members into the recesses of the units when positioning the cover plate on the flange.

7. In a device of the character described, a carrying element formed with a plurality of openings, carrying elements including shank portions arranged within said openings, annular recesses at one end of the openings, heads on the shanks to be seated in the recesses, penetrating prongs at the other ends of the shanks, and a locking plate engaged over the headed ends of the shanks to retain said shanks within said openings.

8. In combination, a table top having an upstanding flange, pins carried by the flange and projecting above the upper edge thereof, recessed units on the top within the confines of the flange, a cover plate, element supporting members carried by the plate, and said plate being formed with openings for receiving the pins on the flange whereby to guide the element carrying members into the recesses of the units.

In testimony whereof, I have hereunto signed my name.

EDWARD SPRAGUE, Jr.